United States Patent [19]

Egging

[11] 4,306,768
[45] Dec. 22, 1981

[54] CREATION OF MULTIPLANULAR IMAGES

[75] Inventor: Keith J. Egging, Milwaukee, Wis.

[73] Assignee: Taito America Corporation, Chicago, Ill.

[21] Appl. No.: 29,439

[22] Filed: Apr. 13, 1979

[51] Int. Cl.³ .............................................. G02B 1/00
[52] U.S. Cl. ....................................... 350/174; 353/28
[58] Field of Search .......................... 272/8.5, 181 R;
350/174, 276 R, 276 SL, 130, 144, 180, 285, 295; 46/45; 353/64 R, 67, 72, 28

[56] References Cited

U.S. PATENT DOCUMENTS

| | | | |
|---|---|---|---|
| 1,371,860 | 3/1921 | Charles | 350/174 |
| 1,680,855 | 8/1928 | Burns | 350/174 |
| 1,821,626 | 9/1931 | Fleischer | 272/8.5 |
| 2,982,179 | 5/1961 | Lace | 350/285 |
| 3,493,290 | 2/1970 | Traub | 350/174 |
| 3,680,949 | 8/1972 | Davino | 350/276 SL |
| 3,744,893 | 7/1973 | Chandler | 350/276 SL |

*Primary Examiner*—John K. Corbin
*Assistant Examiner*—B. W. de los Reyes
*Attorney, Agent, or Firm*—Andrus, Sceales, Starke & Sawall

[57] ABSTRACT

A multiplanular image creating device includes a housing having a viewing port and primary and secondary image generation chambers therein. The primary chamber is divided into a plurality of cells, each of which contains an image source such as a portion of a video display tube surface or an actual physical object. A plurality of light transmissive two-way mirrors are disposed between the cells and the viewing port. The mirrors may be arranged to increase the perceived depth of field beyond the confines of the image source itself. The mirrors may be selectively movable relative to each other to provide the illusion of movement of a fixed image source. Variations in light intensity of the different images reaching the viewing port may be adjusted or equalized. Non-parallel two-way mirrors may be placed in the light travel path to create multiple images. The secondary image creation chamber contains fixed or movable shelves of varying widths.

11 Claims, 10 Drawing Figures

CREATION OF MULTIPLANULAR IMAGES

U.S. PRIOR ART OF INTEREST

| | | |
|---|---|---|
| U.S. Pat. No. 1,821,626 | Fleischer | September 1, 1931 |
| U.S. Pat. No. 2,611,817 | Schwarz | September 23, 1952 |
| U.S. Pat. No. 2,740,833 | Gretener | April 3, 1956 |
| U.S. Pat. No. 2,845,618 | Huffman | July 29, 1958 |
| U.S. Pat. No. 2,888,857 | Stevenson et al | June 2, 1959 |
| U.S. Pat. No. 3,182,547 | Armstrong | May 11, 1965 |
| U.S. Pat. No. 3,317,206 | Holt | May 2, 1967 |
| U.S. Pat. No. 3,373,654 | Carolan et al | March 19, 1968 |
| U.S. Pat. No. 3,680,949 | Davino | August 1, 1972 |
| U.S. Pat. No. 3,944,336 | Carr, Jr. | March 16, 1976 |

BACKGROUND AND SUMMARY OF THE INVENTION

This invention relates to the creation of multiplanular images for use in amusement galleries, for home entertainment and for any other desired purpose.

It has already been proposed to create multiplanular images for viewing whereby, through the use of mirrors and the like, a sense of three-dimensional realism is created. See, for example, the above-identified U.S. Pat. Nos. 1,821,626 and 3,182,547. The older of these two patents also suggests the utilization of a pair of image generation chambers in combination to heighten the depth effect.

It is an object of the present invention to improve upon the previously known devices in such a manner so that the number of optical effects which can be created are substantially increased. Furthermore, it is an object of the invention to improve the results obtainable with the known devices.

Broadly, it is contemplated that the image production device includes a housing having a viewing port therein and which has a primary image generation chamber. The said chamber is divided into a plurality of cells, each of which contains an image source therein which, when illuminated, is viewable through the viewing port via a plurality of angled light-transmissive mirror-like elements which provide reflective surfaces. The image source may comprise a projection on a screen and/or video display tube which extends across the cells, or actual physical objects disposed within the cells themselves.

In some instances, it may be desired to increase the perceived depth of field substantially beyond the confines of the image source itself. In the present embodiment, this is accomplished by positioning the reflective surfaces to increase the travel distance of the reflected images between the image source and the viewing port.

It may also be desirable to provide the illusion of movement of one image relative to another when, in fact, the image sources are fixed in space. In the present embodiment, this is accomplished by mounting the reflective surfaces so they are selectively movable relative to each other.

When using a video display tube as the multiple image source, the intensity or brightness of the image arriving at the viewing port from the different cells may not be uniform due to the different light travel paths and different number of passes through the light-transmissive elements. Means are provided to generally adjust or equalize this difference in intensity.

Furthermore, it may be desirable to create blurred or shifted multiple images from a single fixed image source, and in the present embodiment this is accomplished by providing a pair of non-parallel light-transmissive mirror-like elements in the light travel path to cause offset multiple reflections.

In addition to the primary image generation chamber it may be desirable to include a secondary chamber, as in the aforementioned U.S. Pat. No. 1,821,626. The secondary chamber is also provided with a plurality of fixed or movable image sources which, in the present embodiment, comprise a plurality of spaced parallel shelves. The width of the shelves increases with the depth of the secondary chamber to provide visibility of all the image sources at the viewing port. Various illuminating devices may be used in the secondary chamber.

BRIEF DESCRIPTION OF THE DRAWINGS

The accompanying drawings illustrate the best modes presently contemplated by the inventor for carrying out the invention.

In the drawings.

DESCRIPTION OF THE PREFERRED EMBODIMENTS

Figure 1:
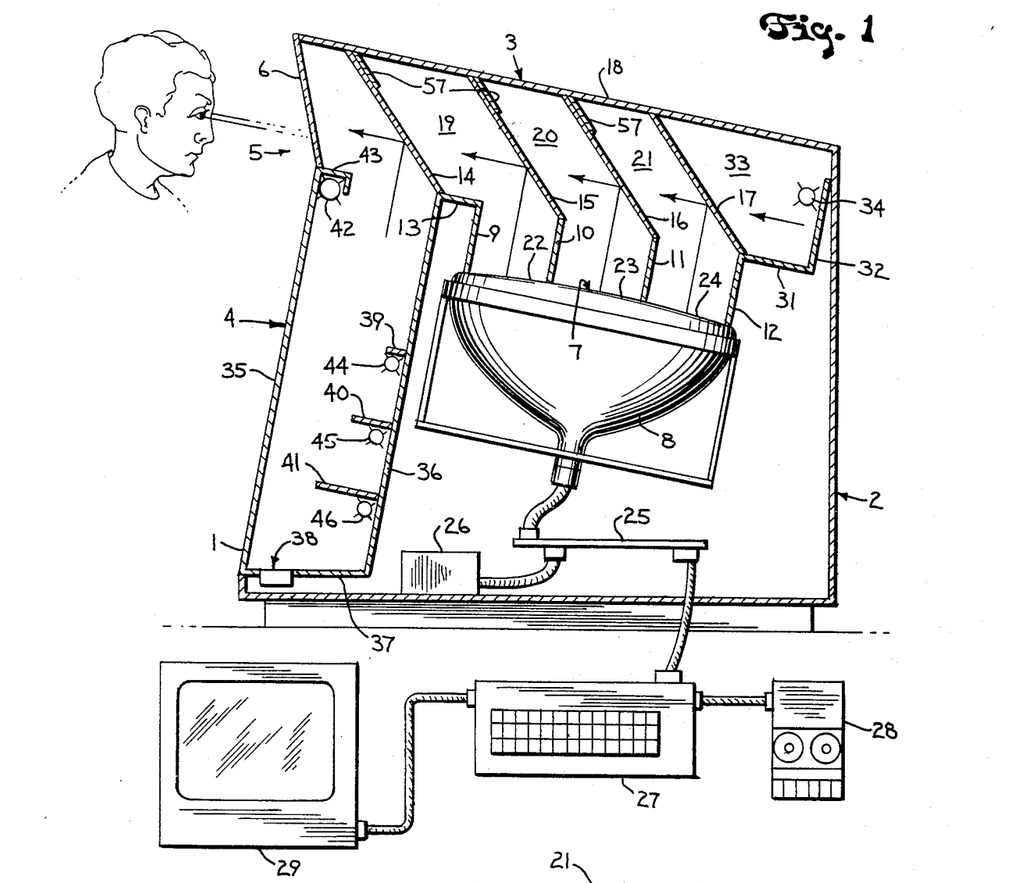
FIG. 1 is a schematic view of a multiplanular image production device constructed in accordance with the invention.

As shown in the embodiment of FIG. 1, the device of the invention comprises a housing 1 divided into a plurality of chambers, designated as 2, 3 and 4. Chamber 2 may contain various equipment, controls and the like. Chamber 3 is disposed at one end of chamber 2 and in the embodiment shown is tilted slightly from the horizontal. Chamber 3 is designated as a primary image generation chamber. A secondary image generation chamber 4 is disposed at the forward end of chamber 3 and is generally normal thereto.

Housing 1 may be made of wood or other suitable opaque material, but is provided with a viewing port 5 which may be open or alternately covered with transparent glass 6 or the like. Port 5 is disposed adjacent to the juncture of image generation chambers 3 and 4 and is optically connected therewith.

When the device is used in amusement galleries or the like, a gun or other input (not shown) may be positioned external to viewing port 5 for use in affecting the images viewed.

In the embodiment of FIG. 1, it is desired to produce a plurality of viewable multiplanular images located on different planes from a single projected generally planular surface, which serves as the image source. For this purpose, the floor boundary of primary image generation chamber 3 comprises the face 7 of a video display tube 8 which is mounted within chamber 2.

Extending upwardly from tube face 7 are a plurality of spaced transverse walls 9-12, the lower edges of which are preferably in engagement with face 7. The top edge of front wall 9 is flanged forwardly as at 13, with the flange serving as the support for the lower edge of a forwardly and upwardly inclined two-way mirror 14. Similar two-way mirrors 15-17 are supported in edge-to-edge extending engagement with the upper edges of walls 10-12.

Although elements 14-17 are designated herein for convenience as two-way mirrows, this term is intended to cover any suitable structure which is light transmissive in a forward direction toward viewing port 5, and which has a reflective surface on its front face. The reflective surface may be a partially silvered coating. Such structures are semi-transparent and semi-reflective. It has been found that the reflectivity of the forward facing surfaces should be about 30% or less.

A roof 18 extends across the upper edges of mirrors 14-17 and extends forwardly to form the upper terminus of viewing port 5.

Respective walls 9-12 and two-way mirrors 14-17 together form a plurality of dividers which, together with the housing walls, borderingly separate primary chamber 3 into a plurality of discrete sub-chambers or cells 19-21 which are arrayed one behind the other over the face 7 of video display tube 8. Cells 19-21 are disposed in series alignment with viewing port 5. This cellular arrangement separates tube face 7 into a plurality of transverse display areas or illuminated image sources 22-24, which are in direct visual communication with cells 19-21 and disposed at different planular depths relative to viewing port 5.

Tube 8 may be activated by any suitable means. For example, the tube may be connected to a logic board 25 having a power supply 26 and hence through the logic board 25 to a micro computer system such as the Model TRS-80 sold in the United States by Radio Shack. Such a system may comprise a keyboard input 27, a tape memory device 28 and a video monitor 29. The micro computer may be programmed to generate any desired image or plurality of images on video display tube face 7, which forms the visual image source.

The images formed on tube face 7 are transmitted through and between cells 19-21 to port 5 where they can be observed by the viewer. The visual image at display area 22 will pass up through cell 19 and be reflected forwardly by mirror 15, and will then pass through the back side of mirror 14 and hence to port 5. Likewise, the image at display area 23 will pass up through cell 20 and be reflected forwardly by mirror 16, and will then pass through the back sides of mirrors 15 and 14 to port 5. The image at display area 24 will pass up through cell 21 and be reflected forwardly by rear mirror 17, and will pass through the back sides of mirrors 16, 15 and 14 to port 5.

Although the originally generated image at tube face 7 is generally planular, the perceived image from chamber 3 at port 5 will be multiplanular if an image is generated in more than one cell. For example, if a line is generated on face 7 and within one cell only, the viewer will perceive that line in a single plane at a depth corresponding to the particular mirror 15-17 which reflects the line. However, if a line is generated which extends diagonally across the entire tube face, the perceived image will be three short lines in three separate planes, with the lines seemingly connected at the juncture between cells, or at the dividers. A multiplicity of effects are possible, even with just a simple line, by causing it to move, shorten and lengthen, become curved, etc. An image of dots also can provide remarkable effects in depth, especially if they are programmed in an on-off manner. Combinations of types and colors of images are, of course, also possible.

Walls 9-12 are positioned to block the direct view of tube face 7 by the observer at port 5. Such direct viewing is highly undesirable in that it tends to destroy the illusion of depth.

Figure 2:
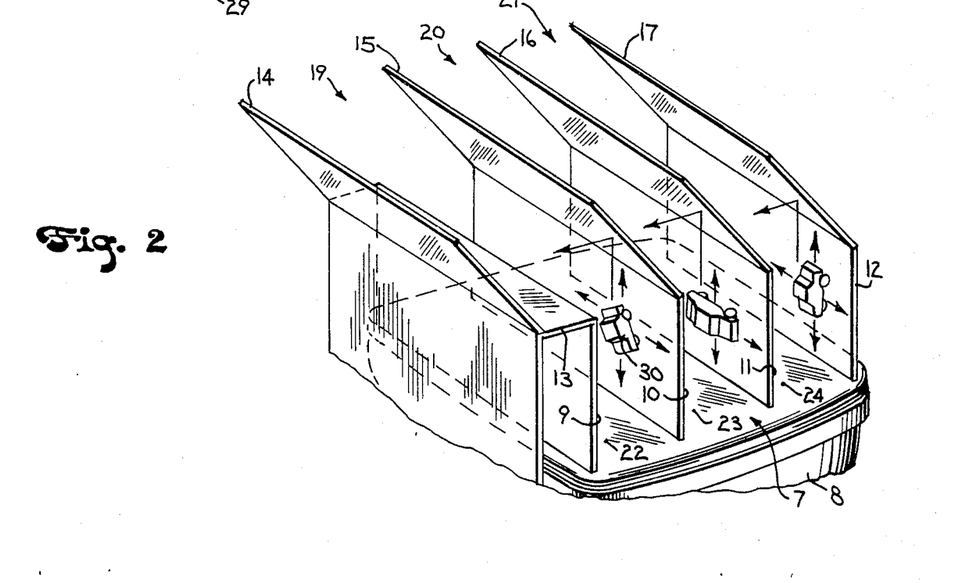
FIG. 2 is a fragmentary perspective view of a primary image generation chamber utilizing actual objects as the image source.

In some instances, instead of or in addition to the planular image generated on video display tube face 7, it may be desirable to provide a three-dimensional image source. Referring to FIG. 2, a plurality of three-dimensional objects such as toy autos 30 are disposed within the cells between the respective divider walls and also between face 7 and the respective mirrors 15-17. Autos 30 may be illuminated by a separate light source, not shown, or may be back-lit in silhouette fashion by tube 8. Tube areas 22-24 may have planular images generated thereon which combine with the auto images. The autos 30 may be made to move within the cells to add a heightened sense of reality.

The embodiments disclosed herein also make it possible to selectively provide a perceived image at port 5, the source of which is independent from the image source generated at tube face 7, but which may be combined to form a composite with the projected image.

Referring to FIG. 1, one such image source is created by extending primary image generation chamber 3 rearwardly of cell 21. This is accomplished by extending roof 18 rearwardly, flanging divider wall 12 back, as at 31, and joining the roof and flange with a generally vertical wall 32 to thereby form a further cell 33 which is also in series alignment with cells 19-21 and port 5. Wall 32 is on the side of mirrors 14-17 remote from port 5. Any image, such as a painted scene, disposed on the forward face of wall 32, and which is suitably illuminated, as at 34, will be transmitted forwardly through two-way mirrors 17-14 to port 5 and will combine with any reflected images from tube face 7.

If cell 33 is not present, mirror 17 need not be of the two-way light transmissive type.

Another such image source may be created by secondary image generation chamber 4. For this purpose, and referring again to FIG. 1, chamber 4 is formed by the wall portion 35 of housing 1 which extends downwardly from port 5, a rearwardly spaced generally vertical wall 36 extending downwardly from flange 13 adjacent mirror 14, and a bottom or end wall 37 which joins walls 35 and 36. The upper end portion of secondary chamber 4 is generally open and exposed to the front of mirror 14 so that any illuminated image source within chamber 4 will be reflected by the mirror toward viewing port 5, either in addition to or in combination with the images from chamber 3.

In the present embodiment, chamber 4 provides a plurality of image sources, both on its end wall 37 and on its side wall 36. The image source on end wall 37 may be painted on, as with wall 32 of cell 33. In addition, a changeable indicia display panel 38 may also be positioned on wall 37. The indicia may comprise a score board, digital readout clock or the like, depending on the intended usage of the device.

The image sources on side wall 36 may comprise a plurality of vertically spaced shelves 39–41 or other image forming members which extend transversely across the chamber, with each shelf being progressively wider as the distance from mirror 14 increases to provide visibility thereof. Shelves 39–41 are each preferably of a different color and/or pattern on their upper surfaces so that the shelves do not become indistinguishably blended in the final perceived image.

Shelves 39–41 provide a further multiplanular image creation which, when coordinated with the images from primary chamber 3 may add color and depth to the original image.

Wall 37 and shelves 39–41 may be illuminated, as by a light source 42 disposed within the upper portion of chamber 4, just beneath viewing port 5. To prevent undesirable reflection of light from source 42 by mirror 14, a baffle 43 is disposed therebetween and beneath port 5. Further illumination may be provided by light sources 44–46 disposed respectively closely beneath each of shelves 39–41, and by providing light-colored undersurfaces on the shelves to reflect light down toward the next lower image source as an illumination assist.

Figure 3:
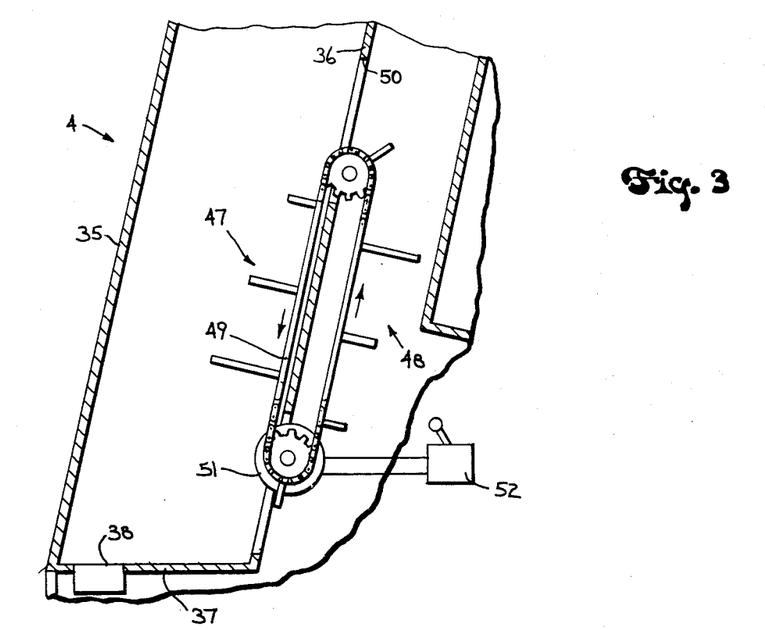
FIG. 3 is a schematic showing of a portion of the secondary image generation chamber wherein the image sources are movable.

As shown in FIG. 1, the image sources 39–41 on side wall 36 are fixed. It may sometimes be desirable to provide moving images sources. For this purpose, and in the embodiment shown in FIG. 3, a plurality of sets 47, 48 of shelves, with each set being generally similar to shelves 39–41, are mounted to extend transversely outwardly from an endless belt 49 which is mounted in a slot 50 in rear wall 36. Belt 49 is suitably driven, as by an electric motor 51 actuatable by a switch 52, to translate the shelves along the length of secondary chamber 4. This provides movement of the sets of multiplanular images away from or toward the viewer.

In both chambers 3 and 4, the elements which are not image sources should be made substantially invisible, such as by painting them black. These elements include divider walls 9–12, flange 13, roof 18, walls 35 and 36, as well as baffle 43.

Figure 4:
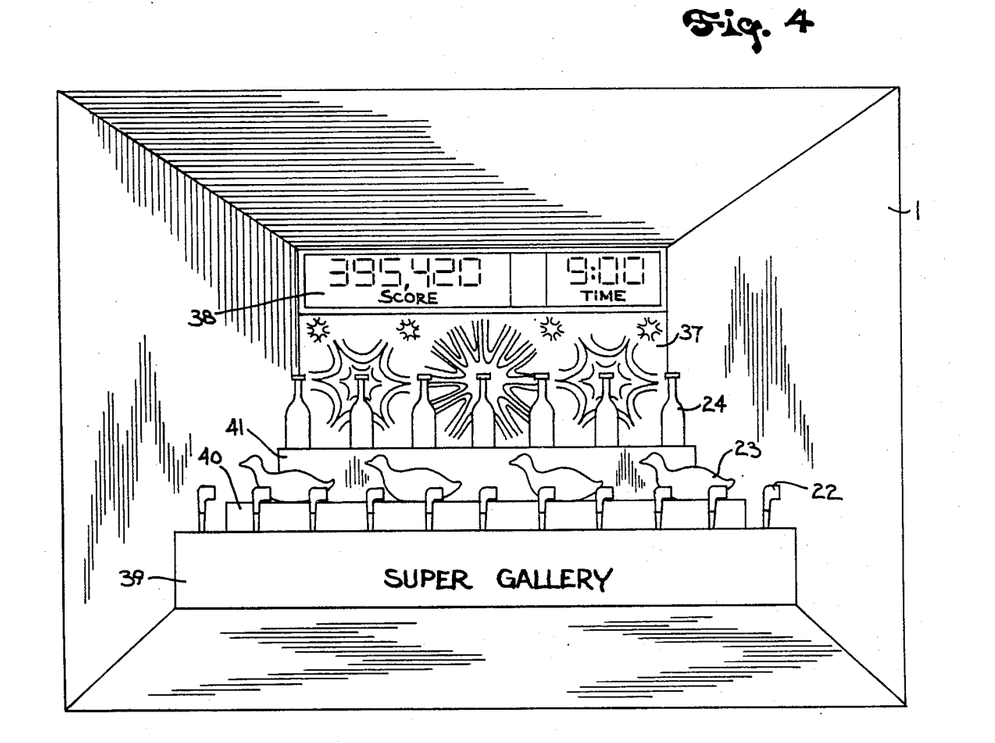
FIG. 4 is an illustration of what a viewer may perceive by looking into the device.

FIG. 4 illustrates the perceived view at port 5 when the device is set up as an amusement device for a shooting gallery or the like. It utilizes both primary and secondary image generation chambers 3 and 4. As shown, shelves 39–41 provide visually perceived multiplanular supports for pipes, ducks and bottles which are actually the images from respective cells 19–21. These images may be programmed to move, change in form, disappear and reappear and even "fly away" between planes. The rear wall 37 has the aforementioned indicia thereon, as well as suitable artwork.

Under certain circumstances, an illusion of greater depth between the image sources 22–24 on tube face 7 may be desired. In FIG. 1, the normal depth of the images traveling from the face of tube 7 is limited by the fact that the actual travel path is directly between tube 7, the mirrors and the viewing port. This limitation may be overcome by a construction shown in the embodiment of FIG. 5 wherein at least some of the images at tube face 7 must travel an extended distance before reaching viewing port 5.

Figure 5:
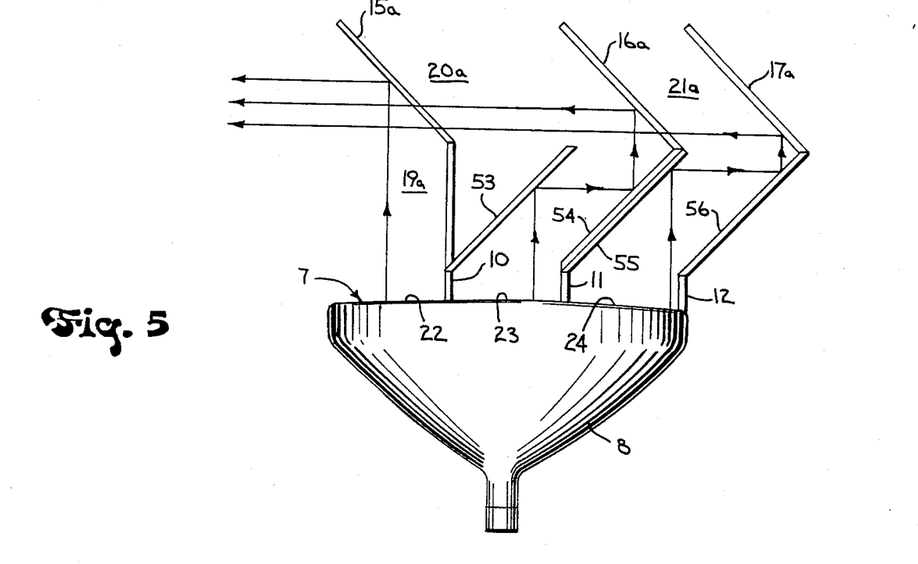
FIG. 5 is a schematic view of a primary image generation chamber and showing one embodiment for increasing the perceived depth of field.

For this purpose, mirrors 15a–17a correspond generally with mirrors 15–17 of FIG. 1.

The image from front source 22 passes upwardly in cell 19a from the tube and is reflected forwardly from mirror 15a, just as in FIG. 1.

The image from middle source 23 passes upwardly from the tube, is reflected rearwardly and then upwardly by a pair of angled intermediate regular mirrors 53 and 54 and henced to two-way mirror 16a. This elongates the image path in cell 20a so that it is greater than in original cell 20 and also greater than the image path from cell 19a.

The image from rear source 24 passes upwardly from the tube, is also reflected rearwardly and upwardly by a pair of angled intermediate regular mirrors 55 and 56 and hence to mirror 17a. This elongates the image path in cell 21a so that it is greater than in original cell 21 and also greater than the image path from cells 19a and 20a.

The resulting extension of the travel path of the images in cells 20a and 21a provides an increased perceived depth of the final image.

Referring to FIG. 1, it is noted that mirrors 14–17 are generally parallel to each other. This has been found to often cause undesirable reflections therebetween which are observable at port 5. This can be selectively eliminated by positioning an anti-reflective shield 57 behind the upper portion of at least some of the mirrors. Shields 57 may comprise any opaque coating or element.

It may at times be desirable to create the illusion of movement of the image in one or more cells relative to the image in the other cells in primary chamber 3. Even though the program providing the images to tube face 7 may be digital in nature, an analog-type movement may be provided for the viewer. Thus, although the image source 22–24 may stay fixed in space, the perceived image may be made to move.

Figure 6:
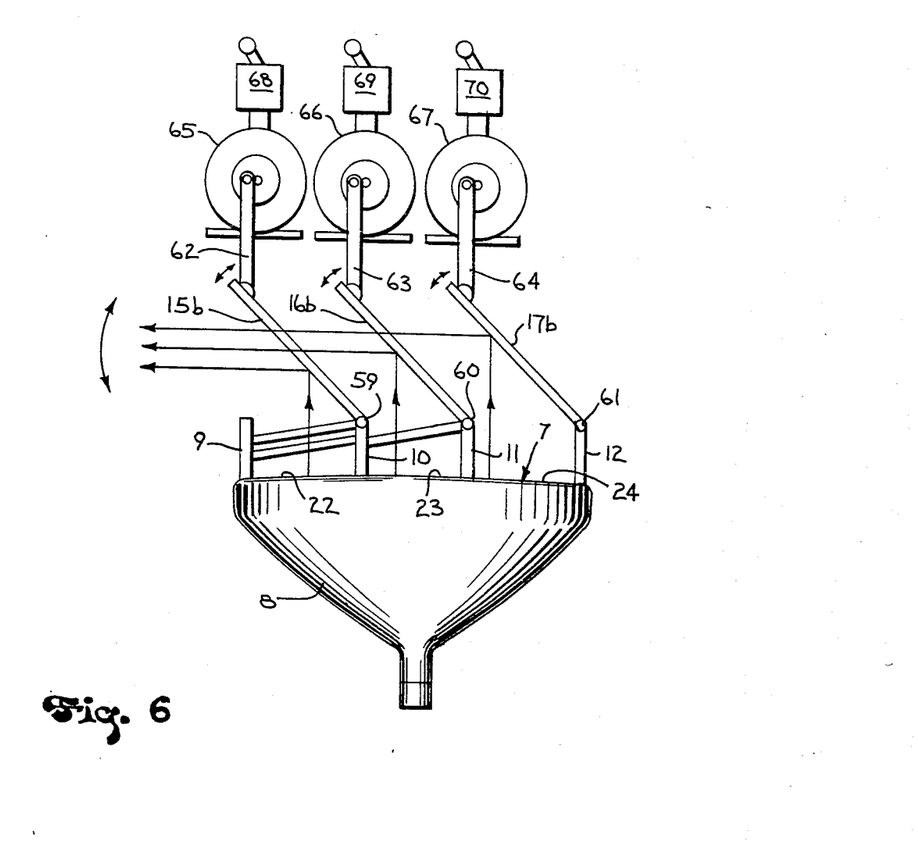
FIG. 6 is a schematic view of a primary chamber wherein the light transmissive-reflective elements are movable relative to each other.

For this purpose, and as shown in the embodiment of FIG. 6, mirrors 15b, 16b and 17b are pivotally mounted along their lower edges, as at 59–61 to the upper edges of divider walls 10–12. The upper edge portions of mirrors 15b–17b are shown as connected through links 62–64 to suitable crank mechanisms 65–67 which may be actuated in any suitable manner, as through switches 68–70. Actuation of one or more cranks causes the image reflected from its respective mirror to shift relative to the image reflected from the other mirrors, thus creating the illusion of movement of the image on tube 8.

The light intensity or brightness of the projected image on the face of a video display tube, such as 7 in FIG. 1, is normally generally the same across the face of the tube. However, the brightness of the perceived image at viewing port 5 will vary, due to the fact that the image from each cell is differently treated. Thus, in FIG. 1, the image in cell 19 reflected from mirror 15 passes through one light transmissive element 14. The image in cell 20 reflected from mirror 16 passes through two light transmissive elements 15 and 14, while the image in cell 21 reflected from mirror 17 passes through three such elements 16, 15 and 14. Assuming equal brightness across the face 7 of tube 8, the perceived image at port 5 will be such that the multiplanular images will progressively darken from front to rear. The device of FIG. 1 thus adjusts the relative light intensities of the perceived images relative to the actual intensities at the source.

Figure 7:
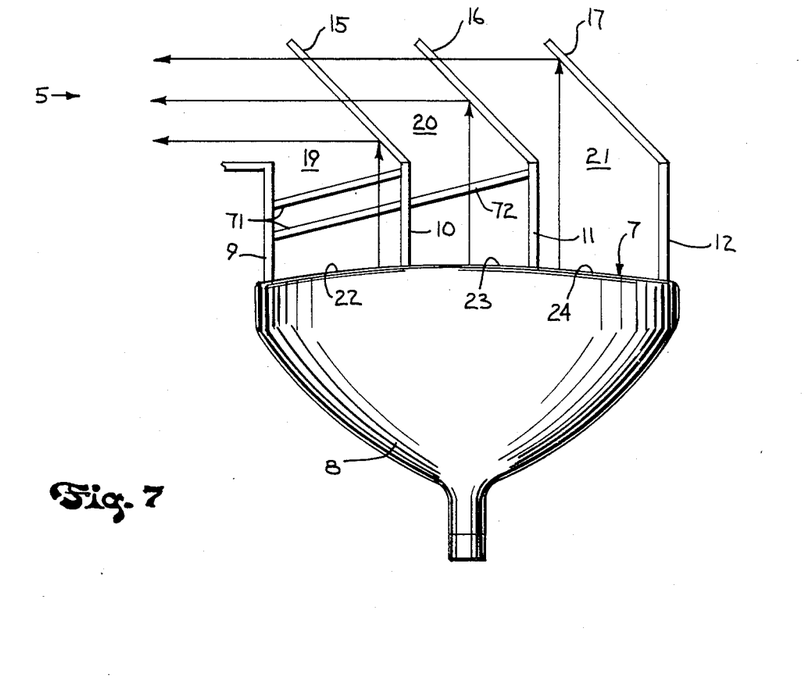
FIGS. 7, 8 and 9 illustrate three embodiments of light intensity adjustment means.

It may be desirable to equalize the perceived intensities between cells, such as in the embodiment shown in FIG. 7. In this embodiment, additional light transmissive elements are disposed in the path of the images in cells 19 and 20 and extend between the respective dividers. Two such elements 71 are positioned in cell 19 between tube 8 and mirror 15, and one such element 72 is disposed in cell 20 between the tube and mirror 16, none being in cell 21. If elements 71 and 72 are of equal transmissiveness as two-way mirrors 15 and 16, the intensity at port 5 will be the same for all cells. This is because, for each cell, the image reflected from its respective mirror passes through the same number of light transmissive elements, in this instance two. The number or effectiveness of the additional light transmissive elements decreases toward the rear to compensate for the greater number of mirrors 15, 16 through which the rearward images must pass.

Figure 8:
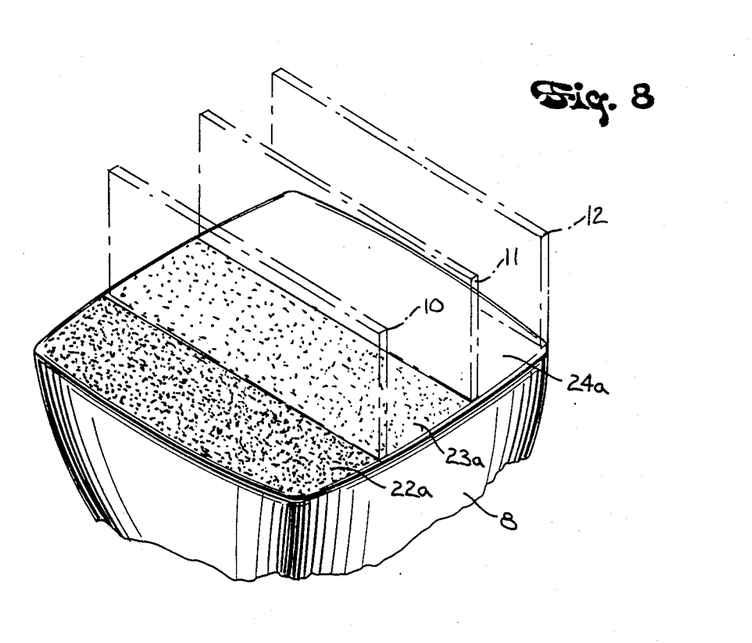

FIG. 8 illustrates a further way to adjust or equalize the perceived images wherein the microcomputer is programmed to provide the face of tube 8 with three portions 22a–24a corresponding to image sources 22-24, with rearmost portion 24a being brightest and each portion forwardly thereof being of an increasingly darker intensity.

Figure 9:
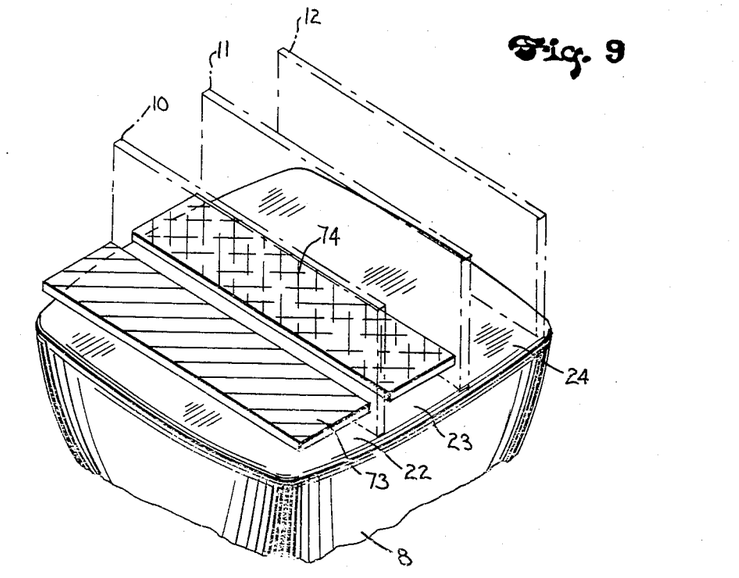

FIG. 9 illustrates yet another way to adjust or equalize the perceived images. In this instance, different colored transparent filter overlays 73 and 74 are positioned over image sources 22 and 23 with the difference in color functioning to change the intensity between cells. For example, an overlay 73 of violet color and an overlay 74 of yellow color will generally equalize the perceived images. A single color of different intensities would also work.

Figure 10:
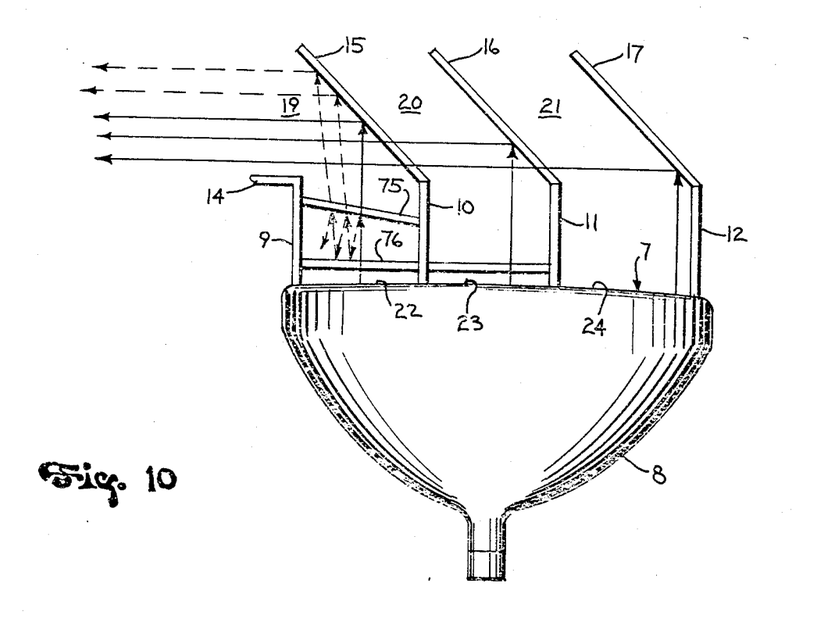
FIG. 10 schematically illustrates the creation of multiple images from a single image source.

In some instances it may be desirable to provide a blurred multi-image effect in one or more of the cells of primary chamber 3. As shown in FIG. 10, a pair of spaced non-parallel mirrors 75, 76 are disposed between image source 22 and mirror 15. Mirrors 75 and 76 are similar to mirror 15 in that they are of the two-way light reflective-transmissive semi-transparent type with their primary reflective surfaces facing each other. The image passing from tube 22 to mirror 15 must pass through mirrors 75 and 76 and, as shown by the arrows, bounces back and forth between the non-parallel surfaces and escapes toward mirror 15. The mirror surfaces need not necessarily be parallel because multiple images will still be created when viewed other than head-on.

The concept of FIG. 10 could be used with any number of cells and may also serve to adjust the light intensities emanating from the cells. As shown, because of the increased elements through which the cell 19 image must pass, the finally reflected intensity will be lowered.

Although many of the basic structures shown in connection with image generation chambers 3 and 4 have been illustrated as rectangular, this need not be the case. For example, to provide a change in perspective, the chamber and cell walls may be constructed to converge or diverge.

The device of the invention provides for the possibility of a multiplicity of illusions for the viewer, and is extremely economical and versatile in concept and operation. There is no need to use multi-colored, polarized or other types of special eye glasses to obtain the depth effect.

Various modes of carrying out the invention are contemplated as being within the scope of the following claims particularly pointing out and distinctly claiming the subject matter which is regarded as the invention.

I claim:

1. In a device for the creation of multiplanular images:
   (a) a housing having a viewing port,
   (b) an image generation chamber disposed within said housing,
   (c) divider means forming a plurality of discrete cells within said chamber, said cells being disposed in series alignment with said viewing port,
   (d) an illuminated image source disposed in direct visual communication with said cells to provide a separate visual image in each cell,
   (e) inclined light transmissive mirrors forming a part of said divider means and bordering each cell for reflecting the visual image in each cell through the light transmissive mirrors and through adjacent cells toward said viewing port,
   (f) a second image source optically connected to said viewing port and independent of said first named image source for selectively creating a perceived image at said port which is a composite of the images from both said first and second sources,
   (g) and a second image generation chamber having one of said mirrors disposed at one end thereof adjacent said viewing port,
   (h) said second image source comprising a plurality of spaced image forming members disposed between said one end of said second chamber and the opposite end thereof,
   (i) said image forming members extending transversely across said second chamber, with said members being progressively wider as the distance from said last-named mirror increases.

2. The device of claim 1 which includes:
   (a) means disposed adjacent said viewing port and said last-named mirror to illuminate said image forming members,
   (b) and a light baffle disposed between said illuminating means and said last-named mirror.

3. In a device for the creation of multiplanular images:
   (a) a housing having a viewing port,
   (b) an image generation chamber disposed within said housing,
   (c) divider means forming a plurality of discrete cells within said chamber, said cells being disposed in series alignment with said viewing port,
   (d) an illuminated image source disposed in direct visual communication with said cells to provide a separate visual image in each cell,
   (e) inclined light transmissive mirrors forming a part of said divider means and bordering each cell for reflecting the visual image in each cell through the light transmissive mirrors and through adjacent cells toward said viewing port,
   (f) a second image source optically connected to said viewing port and independent of said first named image source for selectively creating a perceived image at said port which is a composite of the images from both said first and second sources,
   (g) a second image generation chamber having one of said mirrors disposed at one end thereof adjacent said viewing port,
   (h) said second image source comprising a plurality of spaced image forming members disposed between said one end of said second chamber and the opposite end thereof,
   (i) and means to move said spaced image forming members within said second chamber.

4. The device of claim 3 in which said moving means comprises:

(a) an endless belt on which said spaced image forming members are mounted,
(b) and means to drive said belt to thereby move said members.

5. In a device for the creation of multiplanular images:
(a) a housing having a viewing port,
(b) an image generation chamber disposed within said housing,
(c) divider means forming a plurality of discrete cells within said chamber, said cells being disposed in series alignment with said viewing port,
(d) an illuminated image source disposed in direct visual communication with said cells to provide a separate visual image in each cell,
(e) inclined light transmissive mirrors forming a part of said divider means and bordering each cell for reflecting the visual image in each cell through the light transmissive mirrors and through adjacent cells toward said viewing port,
(f) and means to shift the path of said reflected image to provide a perceived illusion of image movement,
(g) the image at said image source being fixed in space,
(h) said path-shifting means comprising means to move said light transmissive mirrors within said chamber.

6. In a device for the creation of multiplanular images:
(a) a housing having a viewing port,
(b) an image generation chamber disposed within said housing,
(c) divider means forming a plurality of discrete cells within said chamber, said cells being disposed in series alignment with said viewing port,
(d) an illuminated image source disposed in direct visual communication with said cells to provide a separate visual image in each cell,
(e) inclined light transmissive mirrors forming a part of said divider means and bordering each cell for reflecting the visual image in each cell through the light transmissive mirrors and through adjacent cells toward said viewing port,
(f) said illuminated image source comprising image generation means including a generally planular projection surface forming a boundary of said chamber,
(g) said divider means comprising a plurality of divider elements extending from said projection surface into said chamber,
(h) and means to adjust the relative brightness of the images perceived at said viewing port relative to the actual brightness of the image sources in said cells,
(i) said brightness adjusting means comprising light transmissive elements extending between said dividers and disposed between said projection surface and said mirrors,
(j) said light transmissive elements comprising a pair of non-parallel members disposed in a cell and having reflective surfaces in facing relationship to thereby create a multiple independent image effect at said viewing port.

7. In a device for the creation of multiplanular images:
(a) a housing having a viewing port,
(b) an image generation chamber disposed within said housing,
(c) divider means forming a plurality of discrete cells within said chamber, said cells being disposed in series alignment with said viewing port,
(d) an illuminated images source disposed in direct visual communication with said cells to provide a separate visual image in each cell,
(e) inclined light transmissive mirrors forming a part of said divider means and bordering each cell for reflecting the visual image in each cell through the light transmissive mirrors and through adjacent cells toward said viewing port,
(f) and means disposed in at least one of said cells to form the image emanating from the image source in said cell into a multiplicity of images.

8. The device of claim 7 in which said last-named means comprises a pair of non-parallel light-transmissive members disposed in said cell and having reflective surfaces thereon.

9. In a device for the creation of multiplanular images:
(a) a housing having a viewing port,
(b) an image generation chamber disposed within said housing,
(c) divider means forming a plurality of discrete cells within said chamber, said cells being disposed in series alignment with said viewing port,
(d) an illuminated image source disposed in direct visual communication with said cells to provide a separate visual image in each cell,
(e) inclined light transmissive mirrors forming a part of said divider means and bordering each cell for reflecting the visual image in each cell through the light transmissive mirrors and through adjacent cells toward said viewing port,
(f) said light transmissive mirrors being generally parallel to each other,
(g) and anti-reflective shields disposed behind at least some of said mirrors to prevent undesirable reflections between said mirrors.

10. The device of claim 2, 4, 8, 1, 3, 5, 7 or 9 wherein:
(a) said illuminated image source comprises image generation means including a generally planular projection surface forming a boundary of said chamber,
(b) and said divider means comprises a plurality of divider elements extending from said projection surface into said chamber.

11. The device of claim 10 wherein said light-transmissive mirrors form extensions of said divider elements.

* * * * *